United States Patent Office 3,445,350
Patented May 20, 1969

3,445,350
METAL PLATING OF PLASTIC MATERIALS
Kenneth A. Klinger, Belpre, Ohio, John J. Randall and Joseph M. Sakach, Jr., Washington, W. Va., assignors to Borg Warner Corporation, Chicago, Ill., a corporation of Illinois
No Drawing. Filed Oct. 11, 1965, Ser. No. 494,861
Int. Cl. C23b 5/60
U.S. Cl. 204—30    15 Claims

ABSTRACT OF THE DISCLOSURE

To improve the adhesion between a substrate, which includes an acrylonitrile-butadiene-styrene (ABS) graft polymer, and a layer of metal electrolytically deposited thereon, the surface of the substrate is treated with an ABS solvent.

---

This invention relates generally to improvements in metal plated plastics, and more particularly to a method of preparing the surface of an organic polymer substrate to improve the adhesion between said substrate and an electrolessly deposited, metallic coating.

Some of the more important commercial processes for applying metallic coatings or finishes to pastic, in the very broadest sense, would include vacuum metallizing, and electroless deposition, either used alone or in conjunction with a subsequent electrolytic plating process. The adhesion provided by vacuum metallizing, a process which is relatively inexpensive and therefore widely used, is generally so poor that lacquers or other finish coatings are required to protect the metal film; and the best process so far developed, considering such properties as plating adhesion, durability, and appearance as being the principal criteria of product quality is one in which a metal finish is electroplated on a metallic conductive layer which is applied by electroless (chemical) deposition onto the plastic.

During the past few years, the markets for metal plated pastic parts have grown rapidly as manufacturers have begun to appreciate the beautiful appearance of such parts when plated with bright, metallic finishes, and to take advantage of the economies in cost and weight afforded by substituting molded plastic parts for metal. Furthermore, such plated finishes are not as susceptible to pitting and corrosion because there is no galvanic reaction between the plastic substrate and the plated metal.

Even though significant progress has been made in the art of plating metal on plastics, the adhesion between the coating and the plastic still leaves much to be desired. This relatively poor adhesion has limited the use of metal plated plastics to special applications of small size. Some of the largest markets, e.g., the automotive and appliance industries, have not fully exploited the potential of such materials because most of the components which are chromium plated are subject to rough handling, scuffing, and abrasion. In addition to the problem of surface abrasion, thermoplastic materials normally have a higher coefficient of thermal expansion than the metal plated thereon. Poor adhesion between the plastic and the plating, or thin-wall encapsulation of the plastic in plated metal, allows differential dimensional changes with temperature which may result in warping, blistering, and cracking of the product. Consequently, strong adhesion between the plastic substrate and the plated metallic layer is essential for any application in which the product is subjected to significant temperature fluctuations.

Experience with plating injection molded plastic parts has shown that the adhesion strength varies considerably over the surface of the molded part depending on such factors as the overall size of the part, the complexity of surface contours, and the proximity of any particular point in the mold to the gate or point of injection. In order to obtain the highest adhesion levels under known plating systems, three variables—(1) stock temperature; (2) mold temperature; and (3) ram speed—have had to be rigidly controlled during the molding operation. Using this invention, these variables become much less important; and large economies in molding operations are consequently obtainable.

Because thermoplastic materials do not conduct electricity, it is common practice to provide a conductive layer, such as copper, by electroless deposition so that the additional thickness of metals, particularly copper, nickel, and chromium, can be electrolytically plated onto the electroless copper layer. While there are several methods of applying this metallic coating by the combined use of electroless and electrolytic procedures, it was not until quite recently that processes were developed which can provide even minimal adhesion of the conductive coating to the plastic. This is because overall adhesion is governed by the bond strength between the plastic substrate and the electroless copper layer. Even with these improved processes, reasonable adhesion can be obtained with only a very few plastics, and then only when great care is taken in all of the steps for the preparation and plating of the plastic substrate. One material which has been found to be especially suitable for metal plating purposes is a graft copolymer of acrylonitrile, butadiene, and styrene (hereinafter referred to as ABS).

We have discovered that when plating parts are molded from ABS resins, the adhesion of the plated layer(s) can be increased substantially by briefly contacting the surface to be plated with an organic solvent and then subjecting the surface to a strong oxidizing agent to promote the activation of bonding sites by forming carboxyl groups on the surface of the substrate. While the selection of the solvent will be discussed in greater detail below, it should be pointed out that the most effective solvents are those which have the ability to actively attack the ABS substrate surface, although actual dissolution is not necessary for the processes described herein to be operable.

It is therefore a principal object of the invention to provide a novel and improved process for treating the surface of molded plastic articles, particularly those injection molded from ABS resins, to improve the adhesion between the plastic substrate and a metal finish plated thereon.

Another object is to provide a surface pre-conditioning method which eliminates the close control required while molding the plateable plastic substrate under known prior art methods.

Another object is to provide an improved, preliminary conditioning process that not only results in higher mean adhesion values, but also reduces the variability between adhesion values at different locations on the surface.

Another object of the invention is to provide an improved process for plating a bright, metallic finish, such as chromium onto an article molded from ABS resins.

Still another object of the invention is to provide an improved article of manufacture characterized by high, uniform adhesion between the plated metal and the substrate over substantially the entire plated surface thereof.

Additional objects and advantages will be apparent from the following detailed description.

GENERAL DESCRIPTION OF PROCESS FOR PLATING CHROMIUM ON ABS SUBSTRATE

As pointed out above, one of the objects of the invention is to provide an improved process for plating a bright, metallic finish, such as chromium, onto an article molded from ABS resins. Although the invention is not to be limited to the particular metal employed as the finish plate, the examples showing the improved adhesion are based on evaluations of chromium plated over intermediate layers of copper and nickel. Consequently, this entire process is set forth in detail to provide a clear understanding of the efficiency of the surface preconditioning steps. The overall process, starting with the molded article and carrying through to be finished, chromium plated product, may be outlined as follows:

(I) Preliminary Surface Conditioning (A) Solvent pre-etch conditioner
 (1) substrate treated with organic solvent to effect deglazing
 (2) rinse
(B) Chemical etch
 (1) treatment of surface with acid-chromate oxidizing agent to promote activation of bonding sites by forming carboxyl groups on surface
 (2) rinse (II) Electroless Plating (A) Sensitizer
 (1) immersion in stannous chloride bath-readily oxidizable stannous ions adsorbed on surface
 (2) rinse
(B) Activator
 (1) immersion in noble metal salt bath, e.g. palladium chloride—acts as catalyst to insure more complete deposition by promoting reduction of copper in subsequent step
 (2) rinse
(C) Electroless copper (nickel)
 (1) contacted with solution containing a soluble copper salt and a reducing agent, such as formaldehyde-copper ions reduced to elemental copper and strong, complex bond formed from the copper to the carboxyl groups on the substrate through the tin and palladium-electroless nickel plating methods may also be employed (III) Electrolytic Plating (A) Ductile Copper Strike
 (1) relatively thin (.0005 in.) layer of ductile acid copper applied to increase resistance to thermal shock
 (2) rinse
(B) Bright copper
 (1) increased thickness of copper (.003 in.) built up in bright acid copper bath
 (2) rinse
(C) Nickel
 (1) layer of nickel approximately 0.00025 in. in thickness plated onto the bright copper
 (2) rinse
(D) Chromium
 (1) finish layer (approximately $15 \times 10^{-6}$ in.) onto the nickel layer
 (2) rinse and dry

PRELIMINARY SURFACE CONDITIONING

The surface of a molded plastic article normally is glossy and quite hydrophobic. Consequently, this surface is unreceptive to the aqueous solutions used in the electroless metal deposition phase of the process. Since the sensitizing and activating solutions will not wet the surface, the metal ions are not adsorbed onto the surface and deposition of the metal cannot proceed.

Rendering the surface of the substrate hydrophilic by roughening has been common practice in plating plastic materials. Initially, this surface roughening was accomplished by some form of mechanical deglazing, such as scrubbing with an abrasive slurry, wet tumbling, dry rolling or abrasive (sand) blasting. Mechanical deglazing of the surface has been found to be fairly effective, but is extremely costly in that many parts have to be finished by hand and, in the case of relatively small parts, or parts with complex contours, it is very difficult to abrade the surface uniformly by conventional means. Another disadvantage to mechanical etching is that it is hard to control and many problems are encountered when the surface abrasion is carried too far. In any event, adhesion values above one pound per inch are only rarely obtainable.

In more recent years, chemical deglazing or etching techniques were developed, usually using strong, acidic solutions, such as sulfuric acid and chromate salts. The latter treatment was found to have the effect of activating bonding sites for the subsequent electroless metal depositions so that while it is sometimes possible to chemically etch without mechanical deglazing, it is not always possible to use mechanical deglazing alone.

Chemical etching by an acid chromate oxidizing solution was then found to be more effective when the surface was pretreated with a strong, caustic, such as sodium hydroxide, combined with immersion in a reducing acid such as hydrochloric acid. This process, or variations of it, has replaced mechanical roughening almost completely in commercial practice; and prior to the present invention, it was probably the best pretreatment process available. Even so, this alkali-acid pretreatment is only marginally satisfactory with respect to adhesion. While adhesion values on the order of one to twelve pounds per inch can be obtained, depending on the type of ABS resin used and the particular molding conditions, these values vary widely from one part to another and from one area to another of the same part. Adhesion values of about five lbs./in. are about the highest that can be consistently obtained on standardized plaques used for testing purposes. On the other hand, by practicing the present invention, adhesion values on any part molded from a plating grade of ABS resin will always be on the order of eleven to thirteen lbs./in., with possible variations on the high side up to 22 to 23 lbs./in.

As pointed out above, the objects of the present invention are attained by the use of a solvent pre-etch conditioner in combination with a chemical surface etchant. The selection of the proper solvent is critical to the efficacy of the process, but unfortunately the determination of such solvents must necessarily be based largely on empirical data and trial and error experimentation.

It should be stated at the outset that the term "solvent" as it is used in this specification cannot be defined in any precise sense. Technically speaking, there are few, if any, real solvents for ABS resins, because most solvents which will dissolve the styrene acrylonitrile phase will only soften or swell the butadiene phase. However, based on considerable experimental data, certain guidelines have been formulated for the purpose of teaching those skilled in the art the selection of a solvent for use in practicing the present invention.

Investigation of the solvency action of a large number of representative organic liquids was based on an empirical test wherein 10 gm. of ABS resin, of a grade suitable for plating purposes, was allowed to remain immersed in 200 ml. of the test liquid for 24 hours, after which time the degree of solvent power was determined by visual inspection. The solvents were then grouped into three categories:

Group I

Solvent remained substantially clear; no significant change in the character of the resin. Solvents investigated which belong in this group included: methanol; ethanol; propanol; iso-propanol; iso-butanol; tert-butanol; petroleum ether; cyclohexane; methyl cyclohexane; diethylene glycol; propylene glycol; cyclohexanol; and formaldehyde.

Group II

Swelling action was observed to various degrees while maintaining a clear solution. Solvents investigated which belong to this group included: formic acid; acetic acid; carbon tetrachloride; benzene; toluene; xylene; Cellosolve; benzyl ether; diethylene glycol diethyl ether; and 3-hydroxy-2-butanone.

Group III

Solvency action to various degrees was observed as evidenced by the formation of a cloudy dispersion or mixture. Solvents investigated which belong in this group included: diacetylmethane; methylethyl ketone; acetone; N,N-dimethylaniline; N,N-dimethylformamide; pyridine; chloroform; ethyl acetate; tetrahydrofuran; methylene chloride; mono-chlorobenzene; orthodichloro benzene; furfuryl alcohol; diacetone alcohol; paradioxane; metacresol; methyl acetate; cyclopentanone; and tetrahydrofurfuryl alcohol.

Subsequent tests for improvements in adhesion showed, almost without exception, that the solvents of Groups I and II either resulted in poorer adhesion than a control sample, or no significant improvement. On the other hand, all of the Group III solvents showed some improvement and several of them, to be discussed below in greater detail, produced an extraordinary increase in adhesion. As a consequence, the term "ABS solvent," as it is used in this specification, is meant to include only those substances whose solvent action is comparable to those classified in Group III above. In other words, any liquid under test which forms a cloudy dispersion or mixture within 24 hours when 200 mls. of it are added to 10 gm. of ABS, due to partial dissolution of the polymer may be regarded as a solvent for such ABS.

In practicing the invention, some solvents may have to be diluted with an inert liquid so that the treatment time and bath conditions can be adjusted for optimum results. This is because some solvents attack the resin so effectively that the surface gels and runs. When this occurs, it is often not even possible to plate the article. For those solvents which are at least partially soluble in water (up to 15% v./v.), water is a suitable diluent; and for solvents which are immiscible in water, n-heptane is preferred.

The molded article to be plated is immersed in a bath which is maintained at the proper temperature for a sufficient period of time to effect a transformation of the surface of the substrate from a high gloss to a relatively dull, matte finish. The article is then removed from the bath prior to gelation or softening of the surface, rinsed thoroughly in water, and then immersed in the chemical etch bath.

The chemical etch treatment, which as pointed out previously is a conventional surface conditioning step, is carried out in a bath containing a powerful oxidizing agent capable of forming carboxyl groups (—COOH) on the surface of the ABS resin. Such carboxyl groups provide active bonding sites for the subsequently deposited electroless copper layer and the bond strength or adhesion is strongly influenced by the number of such active sites. While the mechanism by which the solvent pre-etch conditioner increases the effectiveness of the chemical etch cannot be completely explained, we have postulated that the solvent selectively softens a portion of the styreneacrylonitrile phase and thereby facilitates oxidation of the butadiene or butadiene-styrene or butadiene-acrylonitrile "backbone."

The composition of the preferred chemical etch bath is as follows:

EXAMPLE I

| | Parts by weight |
|---|---|
| $Na_2Cr_2O_7$ | 102 |
| $H_2SO_4$ (95.5–96.5%) | 2,930 |
| $H_3PO_4$ (85%) | 1,825 |
| $H_2O$ | 1,020 |

The processing in this bath, used in plating all of the samples described below, is preferably conducted using a bath temperature of 150° F. and a treatment time of ten minutes.

ELECTROLESS PLATING

While there are many prior art processes for electroless metal deposition, a preferred process comprises the application of copper by a tin-palladium transfer technique in which the surfaces on which the copper is to be deposited are activated and sensitized to catalyze the chemical surface reduction. This process is similar to those described in United States Patent 3,011,920, issued to Charles R. Shipley, Jr., on Dec. 5, 1961.

The initial sensitizing step consists of immersing the molded part, after surface conditioning, in a solution containing stannous chloride and hydrochloric acid. In addition to stannous chloride, various other stannous compositions, such as stannous fluoborate and stannous sulfate, would be suitable in this formulation. The sensitized surfaces are then rinsed to insure the removal of the excess stannous ions from the surface to prevent contamination of the activator bath.

The activator bath, which may be regarded as a "seeder" bath, comprises a solution of palladium chloride and hydrochloric acid. Following a rinse to remove the last traces of this activating bath, the material is then ready for immersion in the electroless copper plating bath. While other catalytic agent combinations can be used, the tin-palladium system is economical and effective.

The electroless copper plating bath comprises a solution of copper sulfate, sodium hydroxide, formaldehyde, and Rochelle salt. In this step, the copper ions are transformed to elemental copper by chemical reduction which actually forms a complex bond from the copper through the palladium and tin to the carboxyl groups in the resin substrate.

In Table I below, the chemical compositions and operating conditions for each bath in the electroless process are set forth. The sequence of these steps correspond to the outline of the complete process above, with the rinse steps omitted.

TABLE I

| Bath | Composition | Parts by weight | Conditions |
|---|---|---|---|
| Sensitizer | $SnCl_2$—$H_2O$ | 5 | 1 Min., 70° F. |
| | HCl (37–38%) | 48 | |
| | Water | 1,000 | |
| Activator | $PdCl_2$ (2% Soln.) | 2.5 | 1 Min., 70° F. |
| | HCl | 1.2 | |
| | Water | 1,000 | |
| Electroless [1] Copper | $CuSO_4 \cdot 5H_2O$ | 10 | 20 Min., 70° F. |
| | NaOH (37–41% w./v.) | 10 | |
| | HCHO (37–41% w./v.) | 10 | |
| | Rochelle Salt | 25 | |
| | Water | 1,000 | |

[1] Must be used while fresh.

Although the description above refers specifically to a preferred method of depositing copper as the conductive layer, it should be understood that this is merely representative of many known processes, not only of plating copper, but of plating out nickel, cobalt, and various noble metals, gold, silver, etc. by electroless deposition. The copper plating process, however, is relatively economical and has proven to be quite effective in nickel-chromium plating systems.

ELECTROLYTIC PLATING

Following the uniform application of the conductive layer by the electroless plating process, the molded parts are in condition for electroplating by any of several known methods. For purposes of explanation, the electrolytic process described herein is one in which a chromium layer is ultimately plated onto the substrate, it being understood that many different metals can be applied by electrolytic processes.

The first step in the electrolytic plating process is the application of the ductile copper strike which improves the plating's resistance to thermal shock. The first application of copper is carried out in what is known as an acid-sulfate copper bath. The copper thickness is then built up by transferring the material to a bright acid copper bath. Cyanide baths are not suitable because they reduce and sometimes destroy the metal-to-plastic adhesion. For best thermal aging ability, the total thickness of the copper layers should be at least three times the thickness of the final nickel or nickel-chromium plate.

Following the bright copper plating, the nickel or nickel-chromium finish is then deposited. The nickel plate provides corrosion resistance and a truer color to the chromium; and the chromium layer is effective in supplying a brilliant, decorative finish, a characteristic color, and outstanding abrasion resistance. The thickness of the final plating, whether it be chromium, gold, or other metal, need not normally exceed 40 millionths of an inch for most purposes. In automotive plating, for example, the article is ordinarily finished with a chromium layer only 10 to 15 millionths of an inch in thickness.

In Table II below, the electrolytic process baths and conditions are outlined. While some of the baths include proprietary chemicals, it should be understood that these are optional in that their primary function is to brighten and improve the appearance of the plate and do not contribute anything to the strength of the adhesive bond. As a matter of fact, their presence in the bath has some negative effects on adhesion, but they are not serious enough to outweigh the appearance factor.

ram speed, and stock and mold temperature conditions present during molding of the article, each of the ABS materials tested was molded in the form of a standard rectangular plaque, approximately 3" x 5" x 1/8". The different lots of plaques used to obtain the data given herein, however, have had differing adhesion values when plated through the usual commercial system. These adhesion values will be referred to as "standard" adhesions. The final three entries in Table III illustrate that such variations do not affect the efficacy of the solvent treatment.

The apparatus used to test adhesion, commonly referred to as a tensometer, has a fixed cross head, a movable cross head, a device for continuously recording the applied load, and means for separating the cross heads at a constant rate, preferably about one inch per minute. A supporting jig attached to the fixed cross head supports the test specimen and insures that the load is applied at approximately 90° to the plastic surface throughout the test period.

Initially, the plated plaques are trimmed to fit the supporting jig, and then the metal layer is cut to form two parallel strips approximately one inch wide on the surface of the plaque. The metal layer is then peeled back manually so that approximately 1/2 inch is available for gripping by the movable cross head. Pieces of re-enforcing tape with an adhesive surface are then applied to both sides of the 1/2-inch tab. In order to further insure comparable results, each of the specimens was pre-conditioned for at least four hours at the same temperature and humidity conditions (approximately 70° F.; 50% RH).

After the specimen has been placed in the tensometer, the test is begun by separating the jaws at approximately one inch per minute while the applied load is recorded continuously. This is carried out until the first metal strip is completely detached from the plastic substrate. The second strip is then tested in the same manner and the numerical values for adhesion are obtained by taking the mean of the maximum and minimum loads recorded on each of the two strips, adding them together, then divid-

TABLE II

| Bath | Composition | Conditions |
| --- | --- | --- |
| Ductile Copper Strike | $CuSO_4 \cdot 5H_2O$, 32 oz./gal<br>$H_2SO_4$ acid (95.5–96.5%), 8 oz./gal<br>Lea-Ronal Copper Gleam ACG,[1] 0.4% by vol<br>Lea-Ronal Copper Gleam B-210,[1] 0.2% by vol<br>Lea-Ronal Copper Gleam ANW,[1] 0.1% by vol<br>Chloride Ion (as HCl acid 37–38%), 50 mg./l | 3 min. at 15 amp./sq. ft. followed by 27 min. at 40 amp./sq. ft. at room temperature (70° F.) then rinsed thoroughly in cold water. Bath is air agitated. |
| Bright Acid Copper | $CuSO_4 \cdot 5H_2O$, 32 oz./gal<br>$H_2SO_4$ acid (95.5–96.5%), 7 oz./gal<br>Udylite Copper Brightener [2]<br>UBAC #1,[2] 0.6% by vol<br>Chloride Ion (as NaCl), 60 mg./l | 60 min. at 40 amp./sq. ft. at room temperature (70° F.) then rinsed thoroughly in cold water. Bath is air agitated. |
| Nickel Bath | Nickel Sulfate (as $NiSO_4 \cdot 6H_2O$), 40 oz./gal<br>Nickel Chloride (as $NiCl_2 \cdot 5H_2O$), 9 oz./gal<br>Boric Acid ($H_3BO_3$), 6.5 oz./gal<br>Nickel Gleam NS-22,[1] 113.5 cc./gal<br>Nickel Gleam, Beta EP,[1] 9.5 cc./gal<br>Nickel Gleam LNW,[1] 9.5 cc./gal | Bath at 130 to 145° F. Current density 20 to 80 amp./sq. ft. (deposits approx. 0.001 to 0.004 in. per hour). Use air agitation to insure a fine, smooth build-up of nickel. Rinse in water. |
| Chromium Bath | Chromic Acid (as $CrO_3$), 34 oz./gal<br>Sulfuric Acid ($H_2SO_4$, conc.), 0.13 oz./gal<br>Diamond CPA 1800,[3] 1.1 oz./gal | Bath at 100° to 120° F. Average current density 150 to 900 amp./sq. ft. (deposits approx. 7.5 millionths of an inch per minute). Deposit 15 millionths of an inch of chromium. |

[1] Trademark of Lea-Ronal Corp., New York, N.Y. [2] Trademark of Udylite Corp., Detroit, Michigan. [3] Trademark of Diamond Alkali Co., Cleveland, Ohio.

ADHESION TESTING TECHNIQUES

Before turning to specific examples which illustrate the outstanding improvement in adhesion over conventional plating methods, the testing procedure, a variation of ASTM adhesion test D–429–64, Method B, will be described in order to make the results meaningful in a statistical sense.

In order to obtain results which afford a true basis for comparison, the electroless and electrolytic plating phases were identical in each case, and only the surface conditioning steps were varied. Furthermore, since adhesion values have, prior to the present invention, depended to a large degree on other (non-process) variables such as the size and shape of the molded article and the ing the sum of the means by two. These numerical results, expressed in pounds per inch (the width of the strip), are the average load required to separate a strip of metal plating one inch wide from the plastic substrate.

ADHESION IMPROVEMENT—VARIOUS SOLVENT CONDITIONERS

In compiling the adhesion test data for various solvents, several grades of ABS resin were used as the substrates. In each case, these materials comprise a butadiene-acrylonitrile-styrene graft polymer including minor proportions of stabilizers, plasticizers, and pigments. Both Cycolac TD 1001 and Cycolac EP 3510 (manufactured by the Marbon Chemical Division of Borg-Warner Corporation)

were used in the tests, and, by comparison with molding resins other than ABS, they have been found to produce superior plated materials. Other ABS resins have been tested with the surface conditioning process of the present invention, and have been found to yield substantially comparable results.

The best adhesion improvement obtained by using the various solvents used in the surface treatment is set forth in Table III below. For example, the exact procedures described in the process outline, the chemical etch bath of Example I and the electroless and electrolytic processes set forth in Tables I and II, respectively, were followed. In some cases, the baths used in the electroless plating phase differed slightly from those of Example I and Table I in that certain commercially available, proprietary solutions [1] were substituted for the standard formulations. However, by comparing the proprietary solutions with the standard formulation, it is clear that they are equivalent insofar as the adhesion tests are concerned. The aforementioned proprietary solutions contain certain additives which prolong the life of the baths and their operating efficiency, but in no way contribute to the improved adhesion obtained by the use of the solvent conditioner. The standard formulations of Example I and Table I, if used while fresh, will give identical results.

It may be noted that in the data for the various examples in Table III, the solvent concentration and operating conditions, in many respects, vary considerably. For example, some of the solvents were used straight and others diluted; some tests were run at a relatively high temperature (approximately 140° F.) for quite long periods of time while others were conducted at room temperature (approximately 70° F.) for relatively short periods of time. The reason for this is that an initial rough estimate of the solvent action on the ABS resin was made to give some indication of the plating properties to be expected following the solvent treatment. The data thus represents the best adhesion obtainable under various conditions and is the result of many tests conducted for each of the solvents listed.

The values for "adhesion change from control" given in the last column are based on controlled samples using the best surface conditioning (cleaning) method heretofore known, i.e. pre-etch treatment using a strong alkali (sodium hydroxide) followed by immersion in a strong reducing acid (HCL). In each case, close control on the sample lots of molded plaques was maintained to determine the standard adhesion values. These were then compared with adhesion tests for samples treated by the various solvent pre-etch conditioners and the percentage change recorded.

TABLE III

| | Treatment Conditions | | | Adhesion Change, Percent From Control |
|---|---|---|---|---|
| | Percent (By Vol.) Concentration | Immersion Time (min.) | ° C. Temperature | |
| Solvent Group I: | | | | |
| Ethanol | 100 | 1 | 25 | +3.7 |
| Iso-Butanol | 100 | 1 | 40 | +2.2 |
| Tert-Butanol | 100 | 5 | 40 | +3.0 |
| Iso-Propanol | 100 | 3 | 25 | −5.3 |
| Pet. Ether | 100 | 5 | 25 | +5.3 |
| Methyl Cyclohexane | 100 | 1 | 40 | −3.0 |
| Diethylene Glycol | 100 | 3 | 40 | −6.8 |
| Propylene Glycol | 100 | 3 | 40 | +4.5 |
| Cyclohexane | 100 | 1 | 25 | −7.5 |
| Cyclohexanol | 100 | 1 | 40 | −9.0 |
| Formaldehyde Solution (37%) | 100 | 3 | 25 | −9.8 |
| Propanol | 100 | 1 | 25 | −13.5 |
| Solvent Group II: | | | | |
| Acetic Acid | 100 | 5 | 25 | −41.7 |
| Formic Acid | 100 | 1 | 25 | (1) |
| Cellosolve | 100 | 3 | 25 | +3.3 |
| Diethylene Glycol Diethyl Ether | 100 | 1 | 40 | −21.6 |
| 3-hydroxy-2-butanone | 100 | 1 | 25 | 0 |
| Benzene | 100 | 5 | 25 | −68.0 |
| Toluene | 100 | 5 | 40 | −63.4 |
| Benzyl Ether | 100 | 1 | 25 | +11.8 |
| Xylene | 100 | 5 | 40 | −2.8 |
| Carbon Tetrachloride | 100 | 1 | 25 | −27.8 |
| Solvent Group III: | | | | |
| Diacetylmethane | 13/aqueous | ⅓ | 60 | +258.0 |
| Acetone | 50/aqueous | ½ | 40 | +314.0 |
| N,N-Dimethylformamide | 30/aqueous | ½ | 50 | +40.6 |
| Methyl Ethyl Ketone | 25/aqueous | 5 | 25 | +54.2 |
| Pyridine | 50/aqueous | 1 | 25 | +20.6 |
| p-Dioxane | 80/aqueous | ⅓ | 40 | +188.0 |
| Tetrahydrofuran | 20/aqueous | 3 | 40 | +73.5 |
| Diacetone Alcohol | 25/aqueous | 2 | 40 | +35.2 |
| Furfuryl Alcohol | 30/aqueous | 1 | 40 | +226.0 |
| Tetrahydrofurfuryl Alcohol | 100 | ¼ | 25 | +48.7 |
| Chloroform | 15/heptane | 1 | 40 | +136.0 |
| Ethyl Acetate | 40/heptane | 1 | 40 | +136.0 |
| Methylene Chloride | 25/heptane | ⅔ | 40 | +185.0 |
| Methyl Acetate | 25/heptane | ⅔ | 40 | +75.0 |
| m-Cresol | 33⅓/heptane | 1 | 25 | +293.0 |
| o-Dichloro Benzene | 10/heptane | 1 | 40 | +29.0 |
| Mono-Chlorobenzene | 10/heptane | 1 | 40 | +23.0 |
| N,N-dimethyl Aniline | 20/heptane | ⅓ | 25 | +42.9 |

[1] Unplateable.

The solvents which consistently give both superior adhesion qualities and good appearance are acetone, methyl ethyl ketone, furfuryl alcohol, p-dioxane and diacetylmethane. Insofar as commercial applications of these solvents are concerned, diacetylmethane is the most useful. This is because it is relatively inexpensive, is non-toxic, and does not constitute a fire hazard. This is not to say that the other solvents cannot be made into workable baths if proper precautions are taken during the conditioning operation.

In order to further illustrate the adhesion improvement obtainable by the use of certain solvents in this group, the examples below set forth adhesion data for such solvents under varying conditions.

EXAMPLE II

A 13% (v./v.) aqueous solution of diacetylmethane was used as the solvent pre-etch conditioner in the plating system employing the chemical etchant of Example I and the processes set forth in Tables I and II. With the

---

[1] Enplate Conditioner 470 was substituted for the etchant formula of Example I. Enplate Sensitizer 432, Enplate Activator 440, and Enplate Cu-400 were used as the sensitizer, the activator and the electroless copper baths respectively of Table I. All of these solutions are manufactured by the Enthone Corporation, New Haven, Conn.

immersion times of ⅓ min., ⅔ min., and 1 min. at a bath temperature of 122° F., the percent of adhesion increase from a control sample was respectively 229%, 156%, and 168%.

EXAMPLE III

Additional plaques were treated with 13% diacetylmethane in the same manner of Example II with the bath temperature maintained at 140° F. The adhesion increase from a control sample for treatment times of ½ min., ⅔ min., and 1 min. were 258%, 164%, and 132%.

EXAMPLE IV

A 13% (v./v.) solution of diacetylmethane was used in a plating system identical to the one discussed in Example II. The articles were immersed in the pre-etch conditioner for periods of ⅓ min., ⅔ min., and 1 min. at 140° F. Adhesion values, expressed in pounds per inch of strip, of 18.0, 20.4, and 19.1 were obtained which, compared to the standard adhesion for such samples, 5.3 pounds per inch, indicates substantial increase in adhesion on the order of 3½ times the standard.

EXAMPLE V

Using a 16⅔% (v./v.) aqueous solution of diacetylmethane in a system identical to Example II with treatment times of ⅓ min., ⅔ min., and 1 min. at 140° F. yielded adhesion values of 19.9, 21.0, and 16.4 respectively.

EXAMPLE VI

A 20% (v./v.) aqueous solution of diacetylmethane was used in accordance with the above example. Adhesion values of 18.8, 15.8, and 13.2 were obtained for treatment times of ⅓ min., ⅔ min., and 1 min. respectively at 140° F.

EXAMPLE VII

Using acetone as the solvent pre-etch conditioner in an aqueous solution 65% (v./v.) in the same manner as the above examples, treatment times of ¼ min. and ½ min. at 77° F. produced increased adhesion of 304% and 214% respectively.

EXAMPLE IX

Using a 30% (v./v.) aqueous solution of furfuryl alcohol, adhesion increases of 118% and 226% were achieved by treatment times of ⅔ min. and 1 min. at 104° F.

It will be understood by those skilled in the art that the term "graft polymer" is a polymeric product which is made by the graft copolymerization technique as described, for example, in the report on Nomenclature of the International Union of Pure and Applied Chemistry (published in the Journal of Polymer Science, vol. 8, p. 260, 1952). Briefly stated, a graft polymer is a long chain polymer or copolymer onto which is grafted, by chemical bonding, short, cross-linking elements of a different composition. Insofar as the term "graft polymer" is applied to those compositions prepared from butadiene, acrylonitrile and styrene, it should be understood that such materials are formed by first preparing a latex of polybutadiene, copolymers of butadiene and styrene, or a nitrile rubber formed from copolymers of butadiene and acrylonitrile. The latex is then copolymerized with acrylonitrile and/or styrene to form a hard, tough resin which is easily molded and has very high impact strength. The term "butadiene" will be understood as including closely related compositions, primarily such conjugated deolefins as isoprene, piperylene, dimethyl butadiene, chloroprene, etc. The term "acrylonitrile" will be understood as including various acrylic acid nitriles, such as methacrylonitrile, chloracrylonitrile, ethacrylonitrile, etc. The term "styrene" includes various monovinyl aromatic hydrocarbons such as o, m, p methylstyrene, m, p ethylstyrene, p isopropylstyrene, dimethyl styrene and alpha methyl styrene.

It should be noted that there is considerable evidence that metal to plastic adhesion can be improved by the present invention where the substrate to be plated is formed from blends of ABS materials with other compatible polymeric compositions. For example, polycarbonates, which have heretofore given poor adhesion when plated by electroless deposition, may be satisfactorily plated by blending significant amounts of ABS (20% by weight or more) therewith. Examples of such blends which are suitable for molding and plating purposes would be ABS, in amounts of at least 20% by weight, with the following compatible polymers: polyvinyl chlorides such as described in U.S. Patent 2,755,270 to R. A. Hayes; polyurethane rubbers such as described in U.S. Patent 3,049,505 to T. S. Grabowski; polycarbonates such as described in U.S. Patent 3,130,177 to T. S. Grabowski; polymethylmethacrylate such as described in U.S. Patent 3,177,268 to W. J. Frazer et al.; polyvinyl chloride and alpha-methylstyrene-acrylonitrile copolymers such as described in U.S. Patent 3,010,936 to H. H. Irvin; and styrene-acrylonitrile copolymers such as described in U.S. Patent 3,053,800 to T. S. Grabowski et al.

From the foregoing description, it can be seen that the present invention provides a method of promoting the adhesion of an electrolessly applied metallic layer on an ABS resin substrate. The advantages of the solvent pre-etch conditioner are so outstanding that they can be accounted for only by a synergistic effect which cannot possibly be attributed to conventional properties of solvents, such as used for cleaning, applied in the prior art. For example, many conventional cleaning solvents which would be effective in cleaning the surface of grease and dirt have no effect on plating adhesion.

While this invention has been described in connection with certain specific examples thereof, it is to be understood that this is by way of illustration and not by way of limitation; and the scope of this invention is defined solely by the appended claims which should be construed as broadly as the prior art will permit.

What is claimed is:

1. A method of improving the adhesion between the surface of an injection molded article and a layer of metal electrolessly deposited thereon, said article being molded from a resin which contains at least 20% of a graft polymer prepared from acrylonitrile, butadiene, and styrene, comprising the steps of treating said surface, prior to depositing said metal layer, with an ABS solvent to effect a deglazing thereof; and thereafter subjecting said surface to an oxidizing agent to promote the activation of bonding sites.

2. A method as defined in claim 1 wherein said ABS solvent is selected from the group consisting of acetone, diacetylmethane, methyl ethyl ketone, p-dioxane and furfuryl alcohol.

3. A method as defined in claim 2 wherein said ABS solvent is diacetylmethane.

4. A method as defined in claim 2 wherein said ABS solvent is acetone.

5. A method as defined in claim 2 wherein said ABS solvent is furfuryl alcohol.

6. A method as defined in claim 2 wherein said ABS solvent is p-dioxane.

7. A method as defined in claim 2 wherein said ABS solvent is methyl ethyl ketone.

8. A method as defined in claim 1 wherein said solvent consists essentially of an aqueous solution of diacetylmethane, approximately 10–30% by volume, the surface of said article being contacted for 0.1 to 5 minutes with the solvent temperature at 110–140° C.

9. A method of plating an injection molded article, said article being molded from a resin which contains at least 20% of a graft polymer prepared from acrylonitrile, butadiene, and styrene comprising the steps of treating the surface of said part with an ABS solvent to effect a deglazing of said surface short of gelling; treating the deglazed surface with a strong oxidizing agent to activate bonding sites on said surface; applying an adherent metallic, electrically conductive layer on said surface by electroless deposition; and thereafter electroplating a metal onto said electrically conductive layer.

10. A method as defined in claim 9 wherein said ABS solvent is selected from the group consisting of acetone, diacetylmethane, methyl ethyl ketone, p-dioxane and furfuryl alcohol.

11. A method as defined in claim 10 wherein said ABS solvent is diacetylmethane.

12. A method as defined in claim 10 wherein said organic solvent is acetone.

13. A method as defined in claim 10 wherein said organic solvent is furfuryl alcohol.

14. A method as defined in claim 10 wherein said organic solvent is p-dioxane.

15. A method as defined in claim 10 wherein said organic solvent is methyl ethyl ketone.

References Cited

FOREIGN PATENTS 254,742  5/1963  Australia.

OTHER REFERENCES

Saubestre et al., Plating, October 1965, pp. 982–983.

JOHN H. MACK, *Primary Examiner.*

W. B. VANSISE, *Assistant Examiner.*

U.S. Cl. X.R.

117—47; 156—2; 204—20